(12) United States Patent
Vijayendran et al.

(10) Patent No.: US 9,126,137 B1
(45) Date of Patent: Sep. 8, 2015

(54) POLYMER NANOCOMPOSITES FOR GAS SEPARATION

(71) Applicant: Battelle Memorial Institute, Columbus, OH (US)

(72) Inventors: Bhima R. Vijayendran, Carlsbad, CA (US); Ramanathan S. Lalgudi, Westerville, OH (US)

(73) Assignee: Battelle Memorial Institute, Columbus, OH (US)

( * ) Notice: Subject to any disclaimer, the term of this patent is extended or adjusted under 35 U.S.C. 154(b) by 43 days.

(21) Appl. No.: 13/945,209

(22) Filed: Jul. 18, 2013

Related U.S. Application Data

(60) Provisional application No. 61/672,790, filed on Jul. 18, 2012.

(51) Int. Cl.
*B01D 53/02* (2006.01)
*B01D 53/12* (2006.01)

(52) U.S. Cl.
CPC ............. *B01D 53/02* (2013.01); *B01D 53/12* (2013.01)

(58) Field of Classification Search
CPC ........... B01D 53/1462; B01D 53/1475; B01D 2257/50; B01D 2257/504
See application file for complete search history.

(56) References Cited

U.S. PATENT DOCUMENTS

| 4,659,343 | A | 4/1987 | Kelly |
| 4,828,585 | A | 5/1989 | Chiao |
| 4,897,457 | A | 1/1990 | Nakamura et al. |
| 4,910,276 | A | 3/1990 | Nakamura et al. |
| 5,151,183 | A | 9/1992 | Sedath et al. |
| 6,396,717 | B2 | 5/2002 | Yasumura |
| 6,572,680 | B2 | 6/2003 | Baker et al. |
| 6,830,694 | B2 * | 12/2004 | Schiestel et al. .............. 210/660 |
| 7,138,006 | B2 | 11/2006 | Miller et al. |
| 7,410,525 | B1 | 8/2008 | Liu et al. |
| 7,510,595 | B2 | 3/2009 | Freeman et al. |
| 7,637,983 | B1 | 12/2009 | Liu et al. |
| 7,846,496 | B2 | 12/2010 | Liu et al. |
| 7,896,948 | B2 | 3/2011 | Deng et al. |

(Continued)

FOREIGN PATENT DOCUMENTS

| JP | 6359334 A | 3/1988 |
| WO | 2006028704 A2 | 3/2006 |
| WO | 2011028342 A3 | 3/2011 |

OTHER PUBLICATIONS

Barbari et al., "Gas separation properties of polysulfone membranes treated with molecular bromine", Journal of Membrane Science, 1995, vol. 107, No. 3, pp. 263-266.

(Continued)

*Primary Examiner* — Christopher P Jones
(74) *Attorney, Agent, or Firm* — MacMillan, Sobanski & Todd, LLC

(57) ABSTRACT

A polymer nanocomposite for separating a target gas from a second gas in a gas mixture includes: (a) a matrix formed from a modified polymer, and (b) nanoparticles incorporated in the matrix, the nanoparticles being functionalized to have a stable interaction with the matrix. The modified polymer has a backbone including (i) a polymer having a selectivity for the target gas over the second gas, and (ii) functional groups covalently linked to the polymer (i) as part of the backbone. The functional groups are capable of further increasing the selectivity of the modified polymer by interacting with the target gas and/or with the second gas.

15 Claims, 1 Drawing Sheet

(56) References Cited

U.S. PATENT DOCUMENTS

| | | |
|---|---|---|
| 2007/0137477 A1 | 6/2007 | Freeman et al. |
| 2007/0209505 A1 | 9/2007 | Liu et al. |
| 2008/0078290 A1 | 4/2008 | Hagg et al. |
| 2008/0141858 A1 | 6/2008 | Liu et al. |
| 2008/0290020 A1* | 11/2008 | Marand et al. ........... 210/500.27 |
| 2009/0126570 A1 | 5/2009 | Liu et al. |
| 2009/0277837 A1 | 11/2009 | Liu et al. |
| 2010/0313752 A1 | 12/2010 | Powell et al. |

OTHER PUBLICATIONS

Powell et al., "Polymeric CO2/N2 gas separation membranes for the capture of carbon dioxide from power plant flue gases", 2005, pp. 1-22.

* cited by examiner

R-NH₂

POLYMER NANOCOMPOSITES FOR GAS SEPARATION

CROSS-REFERENCE TO RELATED APPLICATIONS

This application claims the benefit of U.S. Provisional Application No. 61/672,790, filed Jul. 18, 2012, the disclosure of which is incorporated herein by reference.

BACKGROUND OF THE INVENTION

This invention relates in general to materials and processes for gas separation, and in particular to polymer nanocomposites for separating a target gas from a second gas in a gas mixture. For example, the polymer nanocomposites can be useful for separating carbon dioxide from the hydrocarbons present in natural gas.

Natural gas is important as a fuel and as a raw material in the petrochemical and other chemical process industries. The term "natural gas" generally refers to gaseous hydrocarbons (comprised of methane and light hydrocarbons such as ethane, propane, butane, and the like) which are found in deposits in the earth, often together with oil or coal. In common usage, deposits that are rich in natural gas are called natural gas fields and deposits that are rich in oil are called oil fields. Often, non-combustible gases such as carbon dioxide ($CO_2$) and nitrogen, and contaminants such as hydrogen sulfide, are found in combination with the hydrocarbons.

The composition of natural gas extracted from the earth varies. For example, a high quality gas field may contain as much as 95% methane with only minor amounts of other materials. On the other hand, gas fields with high proportions of non-combustible gases and/or contaminants are common. For example, a $CO_2$-rich gas field may contain 40% to 70% or more carbon dioxide. Also, natural gas extracted from an oil field using $CO_2$ flooding for enhanced oil recovery may be high in carbon dioxide.

For most markets, it is desirable to minimize the presence of non-combustible gases and contaminants in the product gas. For example, a typical gas pipeline specification requires no more than 2% carbon dioxide. Before $CO_2$-rich natural gas is sent to the supply pipeline the carbon dioxide content is reduced.

Various techniques are known for removing carbon dioxide from natural gas. Among the techniques is absorption of carbon dioxide with a chemical or physical solvent or with a molecular sieve. For example, absorption with an amine is a widespread commercial process.

Another technique for removing carbon dioxide from natural gas is separation with a polymeric gas separation membrane. Different types of polymer membranes allow different gases under pressure to pass through them faster than other gases. For example, membranes made from cellulose acetate or polyimide are more permeable to carbon dioxide than hydrocarbon gases. Given a feed stream of natural gas, the carbon dioxide will pass through or permeate across a cellulose acetate membrane faster than will the hydrocarbon gases, resulting in a permeate stream concentrated in carbon dioxide and a residue stream concentrated in hydrocarbon gases.

Preferably, a polymeric gas separation membrane has a high selectivity or separation factor, i.e. the membrane is highly effective in separating carbon dioxide from hydrocarbon gases because it allows one type of gas to pass through much faster than the other. Also preferably, a polymeric gas separation membrane has a high flux, i.e., it allows a relatively high rate of flow of gas through the membrane so that the separation process is useful on a commercial scale. However, membranes with high selectivity are generally characterized by low permeability, while membranes with high permeability generally have low selectivity.

Another problem with polymeric gas separation membranes is that the gases can cause "fouling" or "poisoning" by plasticization or swelling of the membrane after a period of use, which damages the properties of the membrane and reduces its separation ability and flux. Also, some polymeric membranes lack sufficient strength and durability, or sufficient thermal and chemical stability, for use in a natural gas separation process. Lack of adequate strength leads to the use of thicker membranes, hindering the flow and transport of separated gases.

Different polymeric gas separation membranes and membrane composites have been tried in the past for separating carbon dioxide from hydrocarbon gases. For example, membranes have been made from polymers with heterocyclic functionality on the backbone to improve the selectivity of the membrane. Polymer crosslinking or processing technology has been used to improve the flux of the membrane. The separation membranes are often relatively thick to provide sufficient strength and durability, but the increased thickness adds to the resistance to gaseous flow and thus decreases flux.

Previously known polymeric membranes for separating carbon dioxide from hydrocarbon gas have suffered from various drawbacks and have not been totally successful. Consequently, it would be desirable to provide improved polymeric compositions for gas separation processes such as separating carbon dioxide from hydrocarbon gas.

SUMMARY OF THE INVENTION

A polymer nanocomposite for separating a target gas from a second gas in a gas mixture includes: (a) a matrix formed from a modified polymer, and (b) nanoparticles incorporated in the matrix, the nanoparticles being functionalized to have a stable interaction with the matrix. The modified polymer has a backbone including (i) a polymer having a selectivity for the target gas over the second gas, and (ii) functional groups covalently linked to the polymer (i) as part of the backbone. The functional groups are capable of further increasing the selectivity of the modified polymer by interacting with the target gas and/or with the second gas.

A gas separation structure for separating a target gas from a second gas in a gas mixture is formed from the above-described polymer nanocomposite.

A method of separating a target gas from a second gas in a gas mixture comprises passing the gas mixture through or alongside the above-described polymer nanocomposite.

Various aspects of this invention will become apparent to those skilled in the art from the following detailed description of the preferred embodiment, when read in light of the accompanying drawings.

DESCRIPTION OF THE PREFERRED EMBODIMENTS

Figure 1:
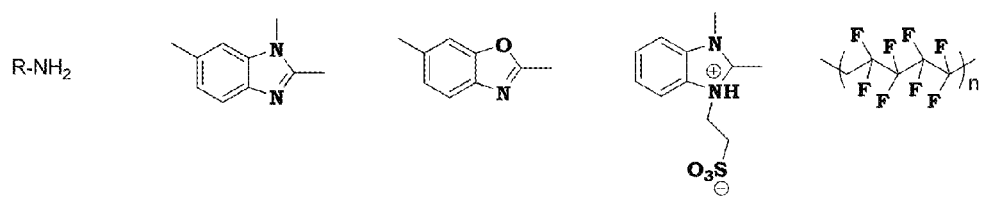
FIG. 1 shows structural formulas of some examples of functional groups that can be incorporated in a modified polymer according to the invention.

The present invention relates to a polymer nanocomposite for gas separation. The polymer nanocomposite can be useful for many different types of gas separations that involve separating a target gas from a second gas in a gas mixture. For example, in certain embodiments the target gas is carbon dioxide and the second gas is one or more hydrocarbons present in natural gas. Alternatively, the polymer nanocomposite may be useful for separation of carbon dioxide from hydrogen or nitrogen, separation of oxygen from nitrogen, separation of helium from nitrogen or methane, or other gas separations.

The polymer nanocomposite comprises a matrix formed from a modified polymer and nanoparticles incorporated in the matrix. The modified polymer includes a polymer that is modified with functional groups as described below. The polymer before modification is referred to herein as the "base polymer". The base polymer has a selectivity for the target gas over the second gas; in other words, the polymer is more permeable to the target gas compared to the second gas. In the example of natural gas including carbon dioxide and hydrocarbons, the polymer is more permeable to carbon dioxide than to the hydrocarbons. In certain embodiments, the base polymer has an inherent dislike for or poor compatibility with hydrocarbons so that it substantially rejects their passage through the polymer.

The selectivity or separation factor of the base polymer can be defined as the ratio of the permeability of the polymer for the target gas to the permeability of the polymer for the second gas. In certain embodiments, the base polymer has a selectivity of at least about 2, at least about 4, at least about 8, or at least about 10. For example, when the polymer nanocomposite is used for the separation of carbon dioxide from natural gas, the measured selectivity can be the ratio of the permeability to carbon dioxide to the permeability to methane.

Any suitable polymer can be used as the base polymer. For example, in certain embodiments the base polymer is selected from poly(benzimidazoles), poly(sulfones), poly(aryl ether sulfones), poly(aryl ether ketones), poly(phenylene oxides), poly(phosphazines), or combinations thereof. Alternatively, the base polymer could be a polymer in common use for gas separations, such as cellulose acetate or polyimide.

The modified polymer includes the base polymer modified by the incorporation of functional groups covalently linked to the polymer as part of the polymer backbone. The functional groups further increase the selectivity of the modified polymer compared with the base polymer alone. As a result, a modified polymer can be produced having a very high selectivity for the target gas.

The functional groups interact with the target gas and/or with the second gas to increase the selectivity of the modified polymer. For example, in certain embodiments the functional groups interact favorably with the target gas, such as by preferentially binding and/or absorbing the target gas, to increase the selectivity of the modified polymer for the target gas. For example, when the target gas is carbon dioxide, the functional groups of the modified polymer may contain nitrogen atoms capable of reacting with the carbon dioxide to form carbonates and/or bicarbonates.

Some nonlimiting examples of functional groups that can interact favorably with carbon dioxide to increase the selectivity of the modified polymer are amines, benzimidazole, benzoxazole, ionically-charged hetero atoms, or combinations of these groups. These groups are shown as the first four chemical structures in FIG. 1.

In other embodiments, the functional groups increase the selectivity of the modified polymer by decreasing the permeability of the modified polymer for the second gas. For example, when the target gas is carbon dioxide and the second gas is one or more hydrocarbons, the functional groups of the modified polymer can preferentially reject the hydrocarbon(s).

Some nonlimiting examples of functional groups that can preferentially reject hydrocarbons are organofluorine compounds, for example, perfluorinated aliphatic alkanes, perfluorinated aromatic alkanes, or combinations of these groups. The perfluorinated aliphatic alkanes are shown in FIG. 1 above as the fifth chemical structure.

The functional groups used to modify the base polymer are different from the monomers making up or characterizing the base polymer. For instance, although poly(benzimidazoles) are listed above as an example of a base polymer and benzimidazole is listed above as an example of a functional group, the modified polymer is not a poly(benzimidazole). The functional groups further increase the selectivity of the modified polymer compared to the base polymer. Thus, for example, a poly(benzimidazole) base polymer could be modified by incorporation of perfluorinated aliphatic or aromatic alkanes to further increase the selectivity of the modified polymer.

The functional groups are covalently linked to the base polymer as part of the backbone of the modified polymer. This polymerization can be conducted by any suitable method, such as by condensation polymerization, addition polymerization or plasma polymerization. For example, the functional groups can undergo condensation polymerization with monomers of the base polymer. The polycondensation reaction can be carried out in solution or by a dispersion method. Alternatively, a base polymer can be modified with functional groups via a post polymerization method.

In certain embodiments, the modified polymer has a high glass transition temperature (Tg). For example, the modified polymer can have a glass transition temperature of at least about 150° C., and in some embodiments at least about 200° C. The high glass transition temperature can increase the durability and thermal stability of the polymer nanocomposite, and can increase the resistance of the polymer nanocomposite to fouling and its effects.

In addition to the matrix formed from the modified polymer, the polymer nanocomposite also includes functionalized nanoparticles incorporated in the matrix. The term "nanoparticle", as used herein, refers to particles having one or more dimensions of the order of 100 nanometers or less. Any suitable functionalized nanoparticles can be used. Some nonlimiting examples of the types of nanoparticles that could be functionalized and used in the nanocomposites include metal oxides, metal phosphates, metal phosphonates, carbon nanotubes, fullerenes, graphenes, zeolites, metal organic frameworks, or combinations thereof.

The functionalized nanoparticles are incorporated in the polymeric matrix in any suitable manner. For example, the modified polymer can be melted and the nanoparticles mixed with the polymer. The nanoparticles can be dispersed relatively uniformly in the matrix, or they can be dispersed non-uniformly such as in an assymetric type membrane with a higher concentration of nanoparticles at the top layer of the membrane.

The nanoparticles are functionalized to have a stable interaction with the matrix formed by the modified polymer. Any suitable functional groups can be included in the nanoparticles. In certain embodiments, the modified polymer has basicity and the nanoparticles are functionalized with acidic functional groups. For example, a polybenzimidazole polymer has a basic nitrogen. The nanoparticles can be functionalized with acidic functional groups such as phosphoric acid, molybdic acid, or heteropolyacids. For example, zirconium phosphate nanoparticles can have an interaction with the polybenzimidazole by crosslinking or other interaction. In other embodiments, the modified polymer has acidity and the nanoparticles are functionalized with basic functional groups. For example, a sulfonated polysulfone polymer having acidity can be functionalized with a base containing metal nanoparticle such as zirconia, titania or silica. The functionality of the nanoparticles can be tailored based on the polymer chemistry and the nature and composition of the gas mixture subjected to separation.

The functionalized nanoparticles having a stable interaction with the matrix can increase the strength and integrity of the polymer nanocomposite, and increase the resistance of the nanocomposite to poisoning by plasticization after exposure to gases, particularly at higher gas concentrations. The improved physical characteristics of the polymer nanocomposite can allow the use of very thin film membranes for gas separations, which allows increased flux by minimizing resistance to flow. The enhanced mechanical properties of the polymer nanocomposite can help it to better withstand high operating pressures in thin films.

In addition, the incorporation of the functionalized nanoparticles in the matrix can create transport pathways or channels through the matrix that increase the free volume and thus the flux of the polymer nanocomposite. The free volume and flux can also be controlled by the architecture and morphology of the modified polymer. In certain embodiments, the polymer nanocomposite has a free volume within a range of from about 5% to about 90%, and more particularly from about 25% to about 90%.

The modified polymer of the nanocomposite provides a high selectivity and the incorporation of the functionalized nanoparticles helps to provide a high flux. Thus, the polymer nanocomposite can provide both a high selectivity and a high flux, in contrast to previous polymers used for gas separation that have a tradeoff between selectivity and flux.

Figure 2:
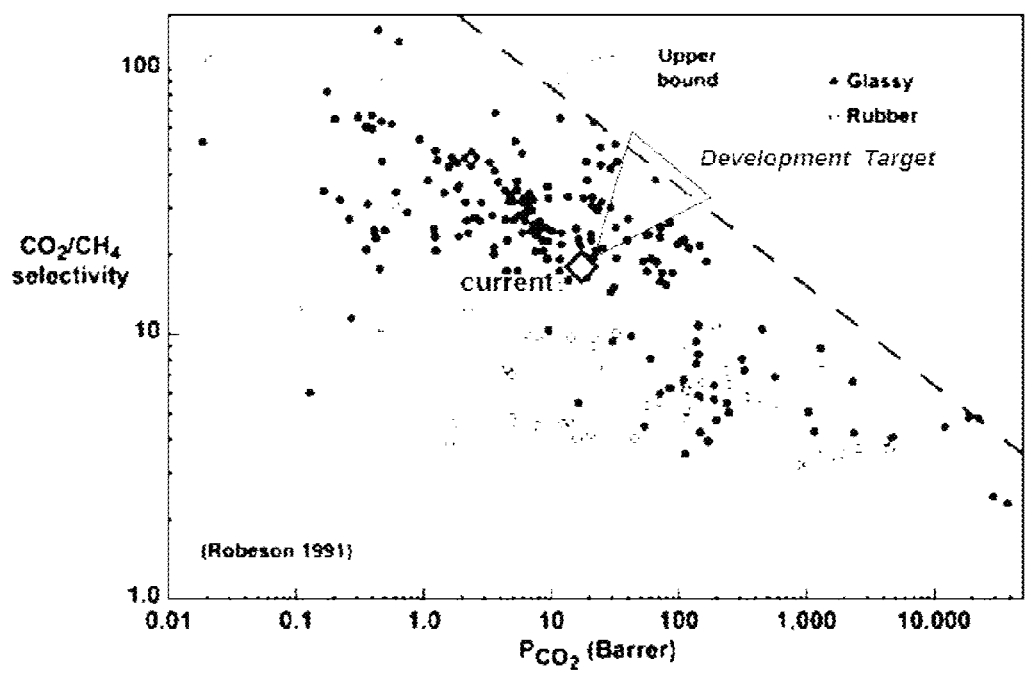
FIG. 2 is a log plot showing Robeson upper bound and selectivity of some commercially available polymers.

FIG. 2 shows a log plot of CO2/CH4 selectivity versus CO2 permeability for some commercially available polymers. In certain embodiments, the polymer nanocomposite has a CO2/CH4 selectivity versus CO2 permeability within the area bounded by the triangle in FIG. 2. Further, in contrast to the commercially available polymers, in certain embodiments the polymer nanocomposite has a CO2/CH4 selectivity versus CO2 permeability that exceeds the Robeson upper bound.

The modified polymer and/or the polymer nanocomposite can have enhanced mechanical properties compared with conventional polymers. For example, the modified polymer and/or the polymer nanocomposite can have enhanced mechanical properties to withstand high operating pressures, and particularly when used in thin films. In certain embodiments, it is expected that the modified polymer and/or the polymer nanocomposite can have a strength improvement of about 50-200% compared with conventional polymers such as cellulose acetate, polyamides, PTFE, etc. Furthermore, the modified polymer and/or the polymer nanocomposite can have reduced plasticization and reduced fouling compared with conventional polymers. In certain embodiments, it is expected that the modified polymer and/or the nanocomposite can have a reduction in fouling of 10-50% compared with conventional polymers, and a concomitant improvement in service life of 25-100%.

The polymer nanocomposite can be used in different types of gas separation structures or devices for use in gas separation processes. For example, in certain embodiments the polymer nanocomposite is formed into a gas separation membrane. As mentioned above, the improved physical characteristics of the polymer nanocomposite can allow the use of very thin film membranes for gas separations, which allows increased flux by minimizing resistance to flow. For example, in certain embodiments the gas separation membrane has a thickness not greater than about 125 micrometers, or more particularly not greater than about 100 micrometers, 80 micrometers, 50 micrometers, or 25 micrometers. The membrane can be formed by any suitable process, such as a casting method.

In other embodiments, the polymer nanocomposite is formed into particles for use in a fluidized bed gas separation apparatus. Any suitable types of particles can be made, for example, the particles can be in a powder or bead form. The particles can be solid or porous, for example, having a controlled porosity.

The principle and mode of operation of this invention have been explained and illustrated in its preferred embodiments. However, it must be understood that this invention may be practiced otherwise than as specifically explained and illustrated without departing from its spirit or scope.

The invention claimed is:

1. A gas separation structure for separating a target gas from a second gas in a gas mixture, the gas separation structure formed from a polymer nanocomposite comprising:
   (a) a matrix formed from a modified polymer having a backbone including:
      (i) a polymer having a selectivity for the target gas over the second gas; and
      (ii) functional groups covalently linked to the polymer (i) as part of the backbone, the functional groups being capable of further increasing the selectivity of the modified polymer by interacting with the target gas species and/or with the second gas species; and
   (b) a plurality of nanoparticles incorporated in the matrix, the nanoparticles being functionalized to have a stable interaction with the matrix, the incorporation of the nanoparticles increasing free volume and thus increasing flux of the gas separation structure.

2. The gas separation structure of claim 1 wherein the target gas is carbon dioxide and the second gas is one or more hydrocarbons in natural gas.

3. The gas separation structure of claim 2 wherein the functional groups of the modified polymer are capable of preferentially binding and/or absorbing the carbon dioxide to increase the selectivity of the modified polymer for carbon dioxide.

4. The gas separation structure of claim 3 wherein the functional groups of the modified polymer contain nitrogen atoms capable of reacting with the carbon dioxide to form carbonates and/or bicarbonates.

5. The gas separation structure of claim 4 wherein the functional groups of the modified polymer are selected from amines, benzimidazole, benzoxazole, ionically-charged hetero atoms, or combinations thereof.

6. The gas separation structure of claim 2 wherein the functional groups of the modified polymer are capable of preferentially rejecting the hydrocarbon(s) to increase the selectivity of the modified polymer for carbon dioxide.

7. The gas separation structure of claim 6 wherein the functional groups of the modified polymer are organofluorine compounds.

8. The gas separation structure of claim 7 wherein the functional groups of the modified polymer are selected from perfluorinated aliphatic alkanes, perfluorinated aromatic alkanes, or combinations thereof.

9. The gas separation structure of claim 2 wherein the polymer (i) is selected from poly(benzimidazoles), poly(sulfones), poly(aryl ether sulfones), poly(aryl ether ketones), poly(phenylene oxides); poly(phosphazines), or combinations thereof.

10. The gas separation structure of claim 1 wherein the nanoparticles are selected from functionalized metal oxides, functionalized metal phosphates, functionalized metal phosphonates; functionalized carbon nanotubes, functionalized fullerenes, functionalized graphenes, functionalized zeolites, functionalized metal organic frameworks, or combinations thereof.

11. The gas separation structure of claim 1 which comprises a gas separation membrane.

12. The gas separation structure of claim 11 wherein the membrane has a thickness not greater than about 125 micrometers.

13. The gas separation structure of claim 12 wherein the membrane has a thickness not greater than about 80 micrometers.

14. The as separation structure of claim 1 wherein the gas separation structure has a free volume within a range of from about 5% to about 90%.

15. The gas separation structure of claim 14 wherein the plurality of nanoparticles create transport pathways through the matrix that increase the free volume of the gas separation structure.

* * * * *